United States Patent [19]

Fisher

[11] Patent Number: 5,971,053
[45] Date of Patent: Oct. 26, 1999

[54] SAFETY RESTRAINT AND BARRIER FOR USE WITH TIRE SERVICING EQUIPMENT

[75] Inventor: William H. Fisher, Conway, Ark.

[73] Assignee: Snap-On Technologies, Inc., Lincolnshire, Ill.

[21] Appl. No.: 08/891,819
[22] Filed: Jul. 14, 1997
[51] Int. Cl.⁶ ................................................. B60C 25/00
[52] U.S. Cl. ............................................ 157/1.1; 157/19
[58] Field of Search .................................... 157/1.1, 1.17, 157/1.22, 1.24, 1.3, 14, 19, 20, 21

[56] References Cited

U.S. PATENT DOCUMENTS

| 3,700,021 | 10/1972 | Motis | 157/1.1 |
| 3,736,975 | 6/1973 | Strang et al. | 157/1.1 |
| 4,742,859 | 5/1988 | Mannen | 157/1 |
| 4,765,387 | 8/1988 | Mannen | 157/1.1 |
| 4,809,759 | 3/1989 | Dale et al. | 157/1.1 |
| 4,811,774 | 3/1989 | Dale et al. | 157/1.1 |
| 4,865,104 | 9/1989 | Mannen | 157/1 |
| 5,623,981 | 4/1997 | Cunningham et al. | 157/1.1 |

Primary Examiner—David A. Scherbel
Assistant Examiner—Joni B. Danganan
Attorney, Agent, or Firm—McDermott, Will & Emery

[57] ABSTRACT

Apparatus usable with a tire changing machine includes a protective arm that may be pivoted about a shaft having an axis that is generally parallel to the radial axis of the wheel and tire assembly when positioned in the tire changing machine. A first section of the arm has one end mounted to the shaft so that the first section may be pivoted substantially in a plane perpendicular to the shaft. At the second end of the first section the arm extends in a section direction generally perpendicular to the first section. Pivoting of the arm permits the second section of the arm to be adjacent, and substantially parallel, to the circumferential surface of the tire and the first section to be adjacent, and substantially parallel, to the side wall surface of the tire. The arm thereby forms a safety barrier against the release of components of the wheel and tire assembly. The arm includes an additional portion that interacts with a safety latch that may be positioned on the tire changing apparatus to lock the arm in an engaged position and to activate pressurize air flow.

8 Claims, 6 Drawing Sheets

FIG. 5A
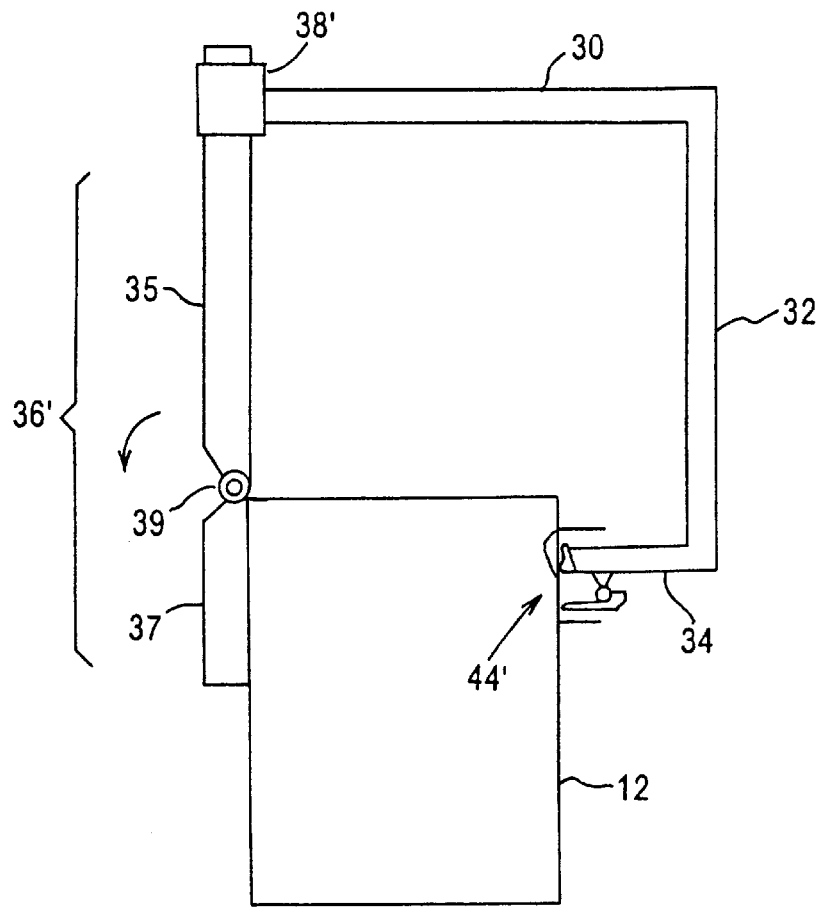
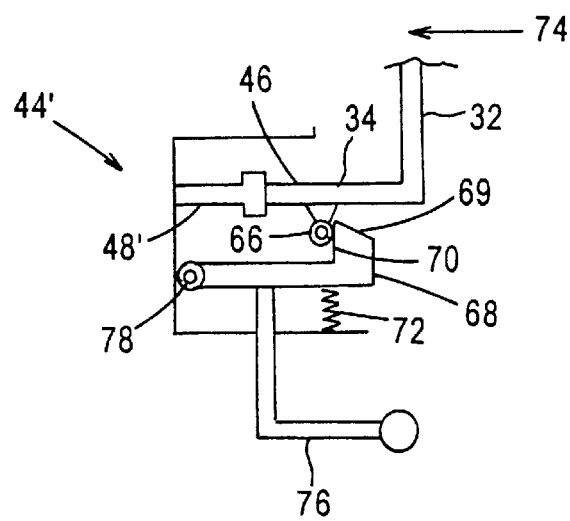
FIG. 5B

SAFETY RESTRAINT AND BARRIER FOR USE WITH TIRE SERVICING EQUIPMENT

BACKGROUND OF THE INVENTION

The present invention relates to safety equipment for use in performing operations involving wheel and pressurized tire assemblies and, more particularly, to a safety barrier and restraint system that secures a wheel and pressurized tire assembly during service or installation operations and that forms a safety barrier and restraint mechanism.

Conventional tire changing apparatus generally comprise a flat surface for laying a wheel and tire assembly on its side so that tire removal, exchange and repair operations can be performed. In tire service or changing operations performed on conventional tire changers there exists the danger of unexpected rapid movement of the assembly or some of its components due to rapid release of tire pressure or explosion. This can be attributable to, for example, a faulty bead or rim, over-inflation or a damaged tire. Such rapid displacement of components may cause injury to an operator or damage to the surrounding environment, including the tire changing apparatus itself.

Some conventional tire changing apparatus are provided with or can be retrofitted with safety belts or brackets to restrain such movement of the wheel and tire assembly to prevent injurious contact with an operator or damage to the surrounding environment. Examples of known safety and restraint devices are described in U.S. Pat. Nos. 4,742,859; 4,865,104; 4,811,774; and 4,765,387, which are incorporated herein by reference. The devices described in these patents include an axially-mounted plunger-type arm having a foot that engages the top center of a wheel rim, a flat bracket that translates vertically along a post and can be positioned above a wheel assembly, a tubular bracket that swivels into place above a wheel assembly, and a flexible belt having a buckle that straps a wheel assembly to the flat tire-supporting surface. These patents also include known means for prohibiting inflation operations by preventing the release of pressurized air from an air source until the safety device is properly positioned or engaged. One of the known means includes a shortened air hose operatively attached to a safety bracket such that the hose will not reach a nozzle on a tire positioned in the apparatus unless the safety device is properly positioned. These and other known devices fail to provide a desired level of safety in tests performed by the present inventor due to limitations that are addressed and overcome by the present invention. For example, the known safety devices generally do not provide restraint against lateral movement of the wheel assembly or one of its components. Others do not provide strong enough barriers. Still, others do not provide means for positively locking or securing the safety device in the safety engaged position. All of the known systems require handling of substantially cumbersome equipment, additional time to operate, or an excessive amount of work area to manipulate all of the structural components. These and other shortcomings of known systems are overcome by the present invention as will be explained below.

SUMMARY OF THE INVENTION

The present invention comprises a restraint and barrier safety device for use with a tire servicing apparatus, such as a tire changing machine, having a base or platform for horizontally positioning a wheel and tire assembly, and at least one vertical post for pivotally mounting tools. The safety device comprises a singular elongated member having horizontal and, preferably, vertical sections and is rotatably mounted to a vertical post and adapted to swivel in a generally horizontal plane between an engaged position and a non-engaged position. The safety device further comprises a safety latch that both locks the elongated member in the engaged position and provides for activation of a switch enabling air flow through a pressurized air conduit.

BRIEF DESCRIPTION OF THE DRAWINGS

FIG. 5A is a partial side view of a second embodiment of the present invention showing the safety apparatus of the present invention mounted on a tire changing machine base.

FIG. 5B is a partial side view schematic of the locking mechanism of the present invention embodiment of FIG. 5A showing the safety apparatus in an engaged position.

DESCRIPTION OF THE PREFERRED EMBODIMENTS

Figure 1:
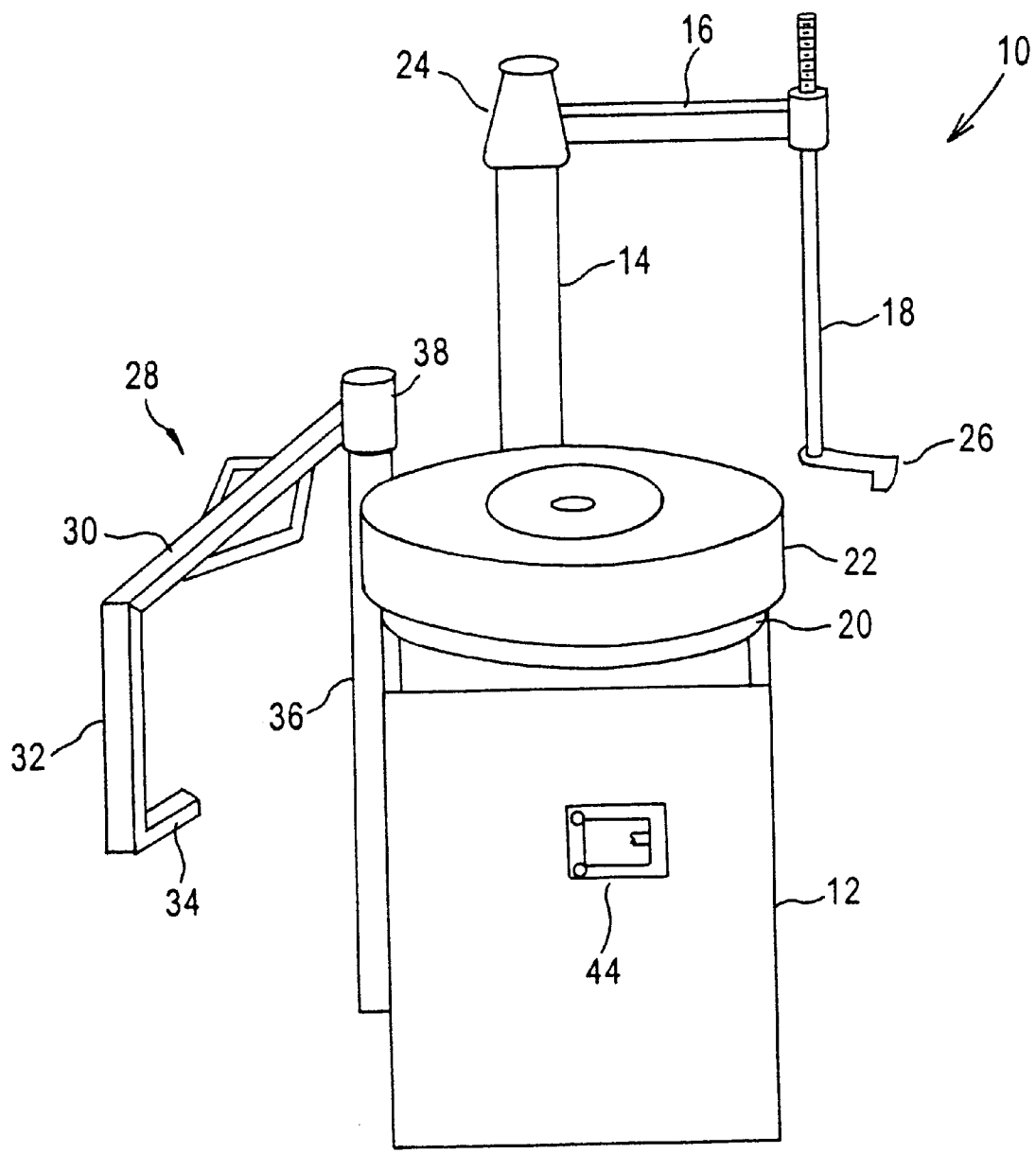
FIG. 1 illustrates a tire changing machine having a wheel and tire assembly mounted thereon and a first embodiment of the present invention safety apparatus shown in a disengaged position.

A preferred embodiment of the present invention is illustrated with respect to FIG. 1 which shows a conventional rim clamp type tire changing machine (10) having a base (12), a first post (14), a tool arm (16), and an extensible tool (18). The tire changing machine (10) further comprises a wheel-mounting base (20) for mounting a wheel and tire assembly (22) thereon.

The tire changing machine (10) may be provided with conventionally known base rotating means (not shown) such as a geared drive and electric motor (not shown) to enable selective positioning of the wheel and tire assembly (22) during operations. The base (20) may be provided with clamps (not shown) or similar means known in the art to hold a wheel and tire assembly (22) in place on the base (20).

The tool arm (16) is rotatably mounted to the first post (14) at a pivot or hinge (24) to allow an operator to swing a tool (18), such as a tire mounter-demounter, into and out of operating position over the wheel and tire assembly (22). The tool (18) may have any type of conventionally-known end piece (26) for performing wheel and tire operations. Preferably, the tool (18) is extensible, or vertically adjustable, so that it can be lowered or raised into operating contact with the wheel and tire assembly.

The improvement of the present invention comprises a safety barrier apparatus (28) comprising a first horizontal section (30), a vertical section (32) and a second horizontal section (34). It is not required that each of the sections (30, 32, 34) be precisely horizontal or vertical. Then first horizontal section (30) is pivotally mounted to a second post (36). The first horizontal section (30) may be, if preferred, rotatably mounted to the first post (14) so that a second post (36) is not required. The second post (36) is securely fixed to the base (12) of the safety apparatus. The first and second horizontal sections (30, 34) and the vertical section (32) are adapted to pivot together about a generally vertical axis at hinge (38).

Figure 2:
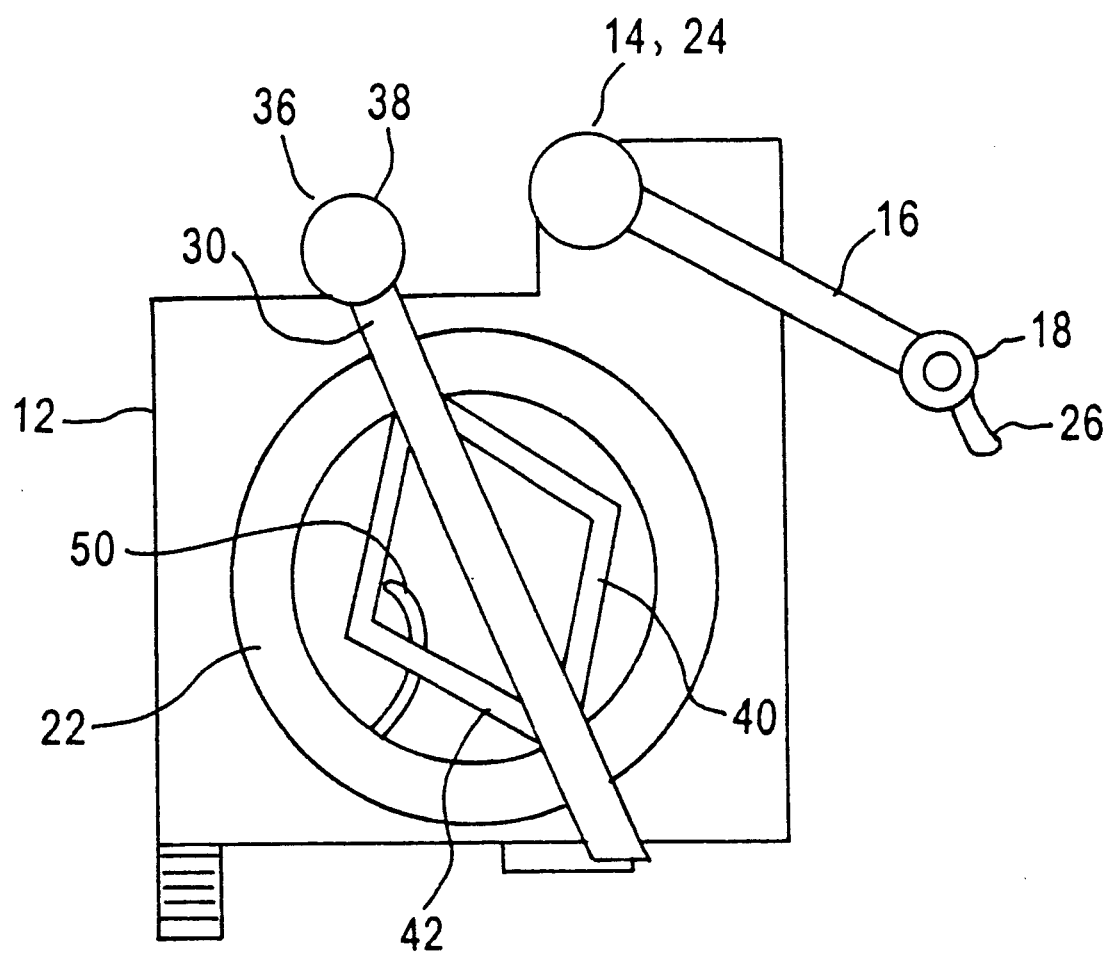
FIG. 2 is a modified top view of the machine and apparatus assembly of FIG. 1 showing the present invention safety apparatus in an engaged position.

A shown in FIG. 2, the first horizontal section (30) can be provided with wing brackets (40, 42) which extend the area of the barrier created by the first horizontal section (30) over the wheel and tire assembly in a horizontal plane.

Figure 3:
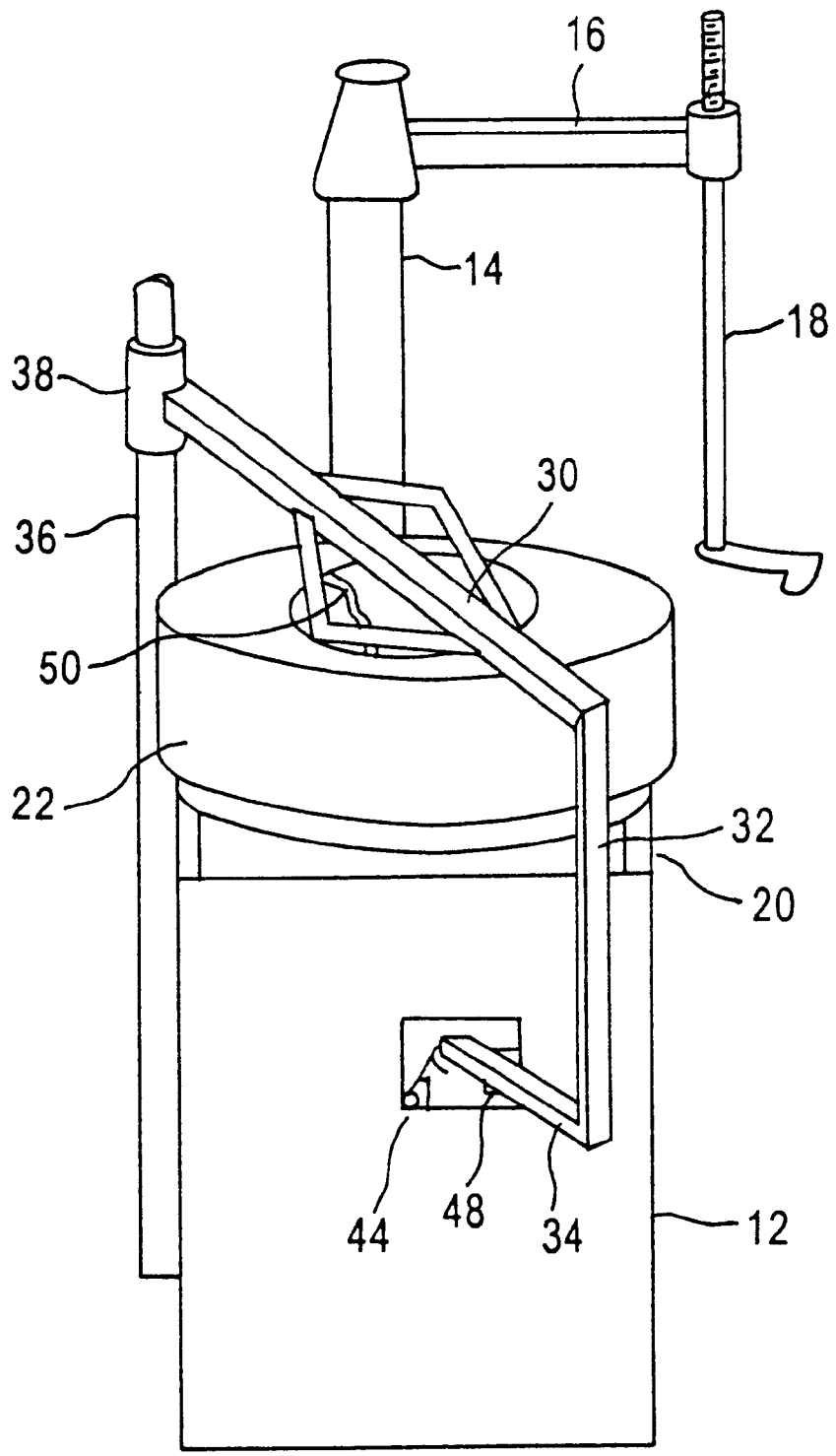
FIG. 3 is a front view of the machine and apparatus assembly of FIG. 2.

As shown in FIG. 3, the safety barrier assembly (28) further comprises a locking mechanism (44) adapted to lockingly receive the distal end (46) of the second horizontal member (34). Further provided in the locking mechanism (44) is an activating switch (48) as shown in more detail in FIGS. 4A–4B. The activating switch (48) causes a valve (not shown), such as an electrical solenoid valve or a hydraulic valve, located in the base (12) or externally to open thereby enabling flow of pressurized air from an air source (not shown) to exit through the inflation hose (50).

Figure 4A:
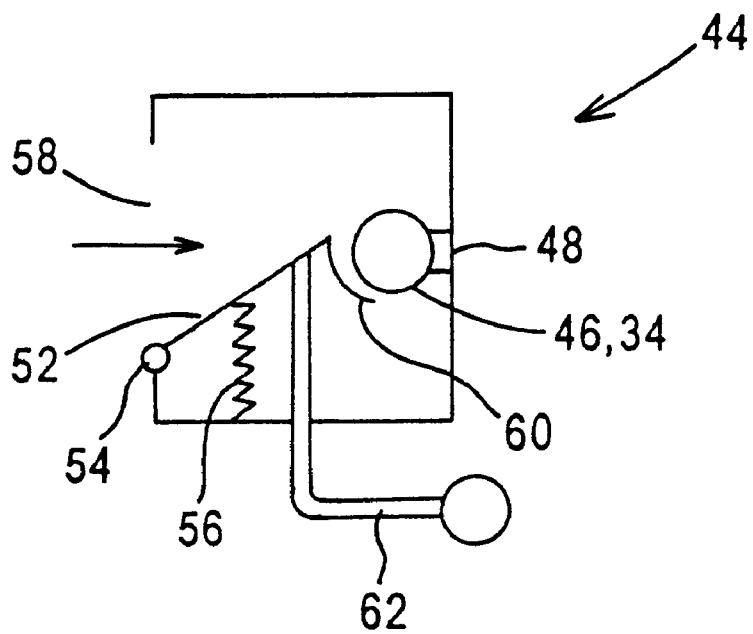
FIG. 4A is a front view schematic and partial cross-sectional view of the locking mechanism of the present invention showing the safety apparatus in an engaged position.
Figure 4B:
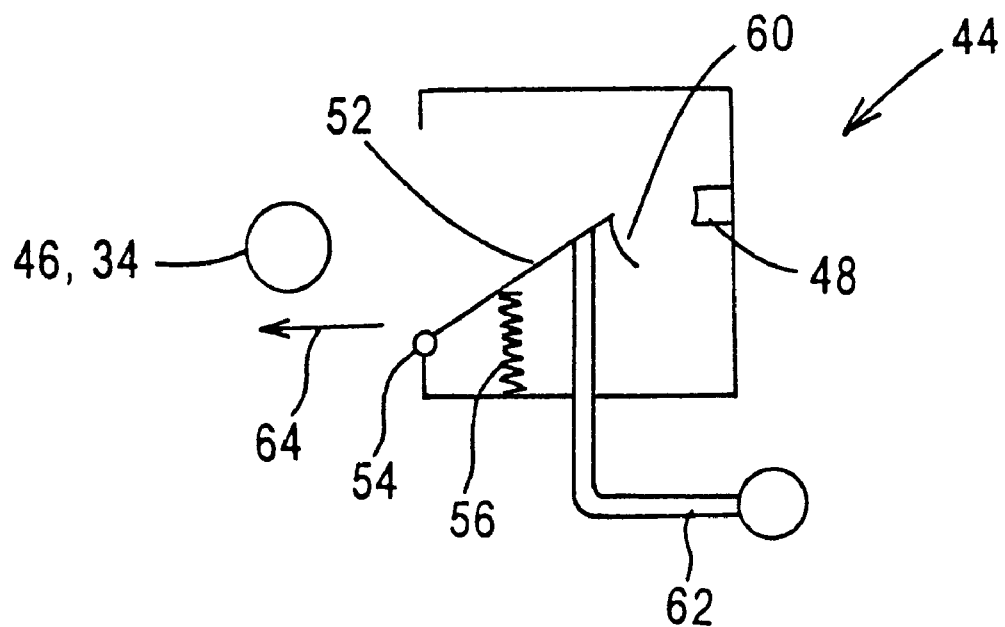
FIG. 4B is a front view as shown in FIG. 4A, showing the safety apparatus in a disengaged position.

As shown in FIGS. 4A–4B, the positive-locking feature of the locking mechanism (44) is accomplished by implementing a spring-biased mechanism such as the latch gate (52) shown. The latch gate (52) has a hinge (54) and spring (56) such that when the distal end (46) of the second horizontal member (34) swings into the locking mechanism (44) in the direction indicated by arrow (58), the gate (52) is biased open to allow the second horizontal member (34) to move past the gate (52) and into contact with the activating switch (48). Once the switch (48) is activated, pressurized air flow is established to enable tire inflation. The gate (52) can be provided with a detent section (60) configured as shown so that the second horizontal member (34) will be trapped in a position past the gate (52) and in contact with the switch (48) to maintain inflation capability so long as the locking mechanism is engaged. An operator can selectively release the locking mechanism (44) and thereby release the switch (48) to stop inflation capability by pulling a release lever (62) which is fixed to the gate (52) such that the gate (52) and detent (60) will move and allow the second horizontal member (34) to be moved out of the locking mechanism (44) in then direction of arrow (64).

As shown in FIG. 5A, the second post (36') may be provided with a hinge (39) having a horizontal axis so that a top section (35) of the post (36') may be pivoted in a generally vertical plane while a bottom section (37) of the post remains fixed in place to the base (12). Such pivotal movement allows the top section (35), the first and second horizontal sections (30, 34), and the vertical section (32) to be moved together into and out of the engaged position. This embodiment does not require that the joint (38') be in the form of a hinge. Alternatively, however, the hinge (39) could be located at the joint (38').

Referring to FIG. 5B, the locking mechanism (44') corresponding to the second embodiment comprises a plunger-type switch (48') for activating pressurized air flow for inflation operations. The distal end (46) of the second horizontal section (34) is provided with a latch-engaging bar (66) or similar means to engage a spring-biased pivoting latch (68) when the second horizontal section (34) is moved in the direction indicated by arrow (74). The spring-biased pivoting latch (68) has a cam surface (69) that, when contacted by the bar (66), causes the latch (68) to swing downward about hinge (78) compressing spring (72) and enabling the bar to slip past the cam surface (69) and lock against the detent surface (70). The axial surface of the distal end (46) thereby contacts the plunger switch (48'). A release lever (76) is provided to release the locking mechanism (44') by pulling the latch (68) down and out of the way so that the second horizontal member (34) can be moved in a direction opposite to arrow (74).

It is understood that each of the first and second horizontal sections (30, 34) and the vertical section (32) may comprise telescoping sections for axially adjusting length to precisely accommodate wheel and tire assemblies of varying dimensions. In addition, the second post (38) may be telescopically adjustable for accommodating various sizes of wheel and tire assemblies.

Figure 6:
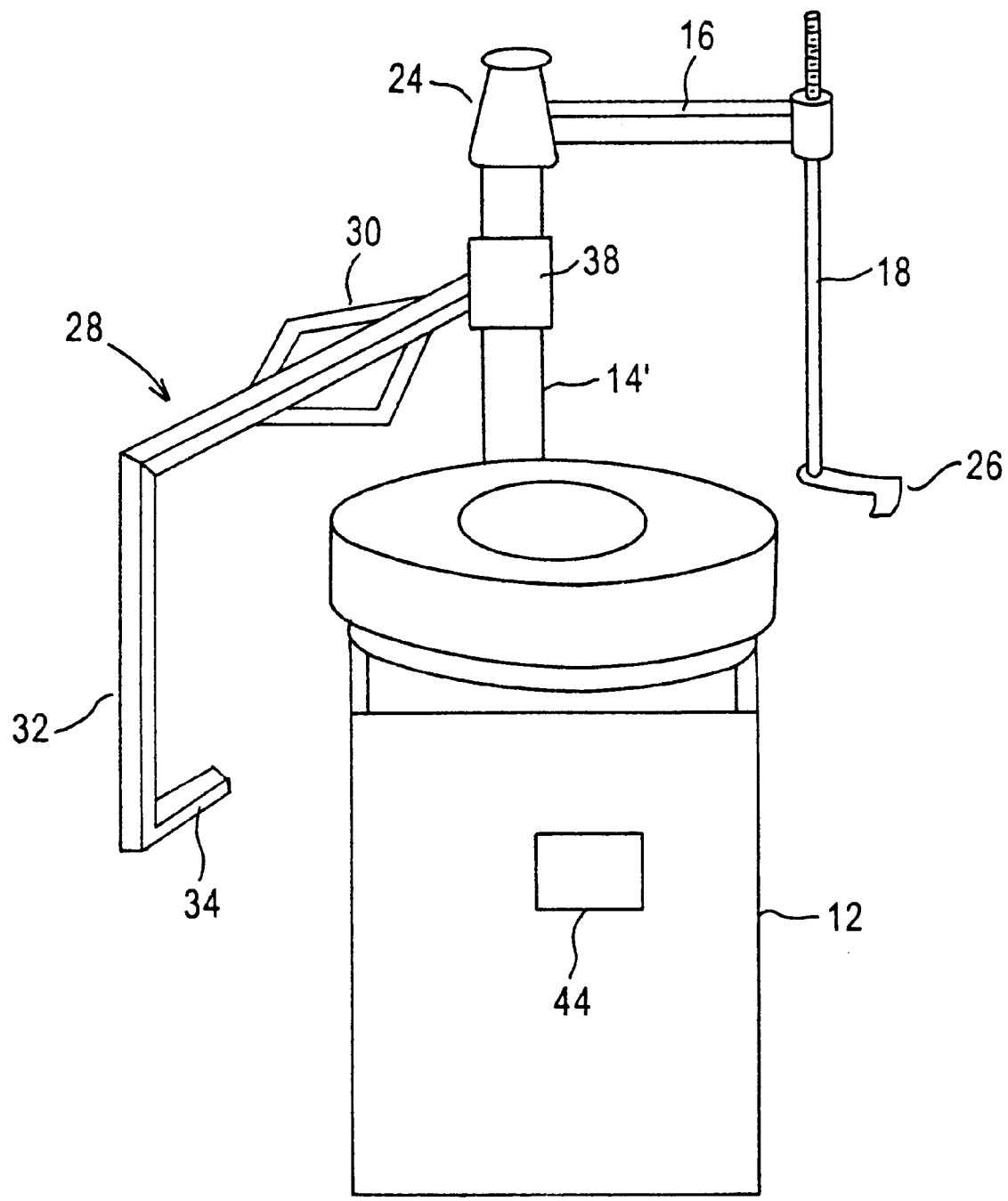
FIG. 6 is a perspective view of a tire changing machine having another embodiment of the present invention safety apparatus shown in a disengaged position.

In another embodiment, illustrated in FIG. 6, the safety assembly (28) can be mounted on a common post (14') shared with the tool arm (16). The functions of the various components of this embodiment are essentially similar to those in the embodiment of FIGS. 1–4.

While the preferred embodiments of the present invention have been herein disclosed and described, it is understood that various modifications can be made to these embodiments without departing from the scope of the presently claimed invention.

I claim:

1. A safety device for use with a tire changing machine having wheel and tire assembly support means and tool positioning means adapted to selectively position a tool for performing operations on a wheel and tire assembly, said safety device comprising:

a generally vertically aligned shaft having a longitudinal axis;

an arm having a generally horizontally extending first section and a first end pivotally mounted to said shaft, whereby said arm is adapted to be selectively positioned over said wheel and tire assembly thereby forming a barrier to protect an operator of said tire changing machine from projectile movement of components of said wheel and tire assembly, wherein said arm further comprises a generally vertically extending section at a second end of said first section, such that when said arm is in a locked position over said wheel and tire assembly, said first section is positioned generally parallel to a surface of said wheel and tire assembly and said generally vertically extending section of said arm is positioned adjacent to a circumferential surface of said wheel and tire assembly and is aligned in a generally vertical plane.

2. The safety device of claim 1, further comprising a latch-engaging member attached to said vertically extending section.

3. The safety device of claim 2, further comprising locking means for locking said arm in a position over said wheel and tire assembly.

4. The safety device of claim 3, wherein said locking means comprise a latch located on an outer surface of said tire changing machine adapted to be engaged by said latch-engaging member.

5. The safety device of claim 4, wherein when said latch-engaging member is engaged to said latch, a switch is activated which activates inflation means for inflating said tire.

6. The safety device of claim 5, further comprising latch-release member for releasing said latch-engaging means in order to de-activate said inflation means.

7. The safety device of claim 1, wherein said tire changing machine further comprises inflation means for inflating said tire; and said safety device further comprises inflation control means that prohibit operation of said inflation means unless said locking means are engaged in a locking position.

8. The safety device of claim 1, wherein one or more of said first horizontal section, vertical section, latch-engaging member and said shaft are adjustable in length.

\* \* \* \* \*